US012587582B2

(12) United States Patent
Pande et al.

(10) Patent No.: US 12,587,582 B2
(45) Date of Patent: Mar. 24, 2026

(54) SELF-HEALING AND DISTRIBUTED PROXY DEPLOYMENT UTILIZING A DECENTRALIZED NETWORK AND REINFORCEMENT LEARNING

(71) Applicant: Dell Products, L.P., Round Rock, TX (US)

(72) Inventors: Pankaj Pande, Carlingford (AU); Jeffrey Scott Vah, Round Rock, TX (US); Morgan Kelley, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 111 days.

(21) Appl. No.: 18/521,809

(22) Filed: Nov. 28, 2023

(65) Prior Publication Data

US 2025/0175521 A1 May 29, 2025

(51) Int. Cl.
*H04L 67/101* (2022.01)
*H04L 67/1042* (2022.01)
*H04L 67/1074* (2022.01)

(52) U.S. Cl.
CPC ........ *H04L 67/101* (2013.01); *H04L 67/1042* (2013.01); *H04L 67/1076* (2013.01)

(58) Field of Classification Search
CPC .......................... H04L 67/101; H04L 67/1042; H04L 67/1076

(Continued)

(56) References Cited

U.S. PATENT DOCUMENTS

2016/0352588 A1* 12/2016 Subbarayan ............ H04L 67/12
2019/0312927 A1* 10/2019 Shalunov ............ H04L 67/1074

(Continued)

FOREIGN PATENT DOCUMENTS

CN 115766746 A * 3/2023

OTHER PUBLICATIONS

Doshi, Ketan. "Reinforcement Learning Explained Visually(Part 4): Q Learning, step-by-step" Towards Data Science. [https://towardsdatascience.com/reinforcement-learning-explained-visually-part-4-q-learning-step-by-step-b65efb731d3e/] Nov. 27, 2020, 30 pages.

(Continued)

*Primary Examiner* — Wing F Chan
*Assistant Examiner* — John Fan
(74) *Attorney, Agent, or Firm* — Amin, Turocy & Watson, LLP

(57) ABSTRACT

Self-healing and distributed proxy deployment utilizing a decentralized network and reinforcement learning is presented herein. A system receives, from respective decentralized proxy nodes of a group of decentralized proxy nodes of a network, information representing a present network state of the network corresponding to respective point-to-point (P2P) communication links between the respective decentralized proxy nodes; and based on the present network state, employs a Q-learning-based reinforcement learning process for optimization, associated with a future network state of the network, of a selection of decentralized proxy nodes to be included in the group of decentralized proxy nodes, a distribution of the selection of decentralized proxy nodes within a network topology of the network, and a load balancing, among the selection of decentralized proxy nodes, of network traffic corresponding to the respective P2P communication links.

20 Claims, 11 Drawing Sheets

100 ⟍

(58) Field of Classification Search
USPC .......................................................... 709/223
See application file for complete search history.

(56) References Cited

U.S. PATENT DOCUMENTS

2021/0111985 A1*  4/2021 Mahalank ............... H04L 67/56
2021/0344614 A1* 11/2021 Mehta ..................... H04L 12/66
2024/0223256 A1*  7/2024 Thalanany .... H04W 36/008375

OTHER PUBLICATIONS

"Q-Learning Guide: Begin with Reinforcement Learning Basics"
Simplilearn. [https://www.simplilearn.com/tutorials/machine-learning-tutorial/what-is-q-learning], retrieved Nov. 11, 2023, 13 pages.

* cited by examiner

100

Figure 2:
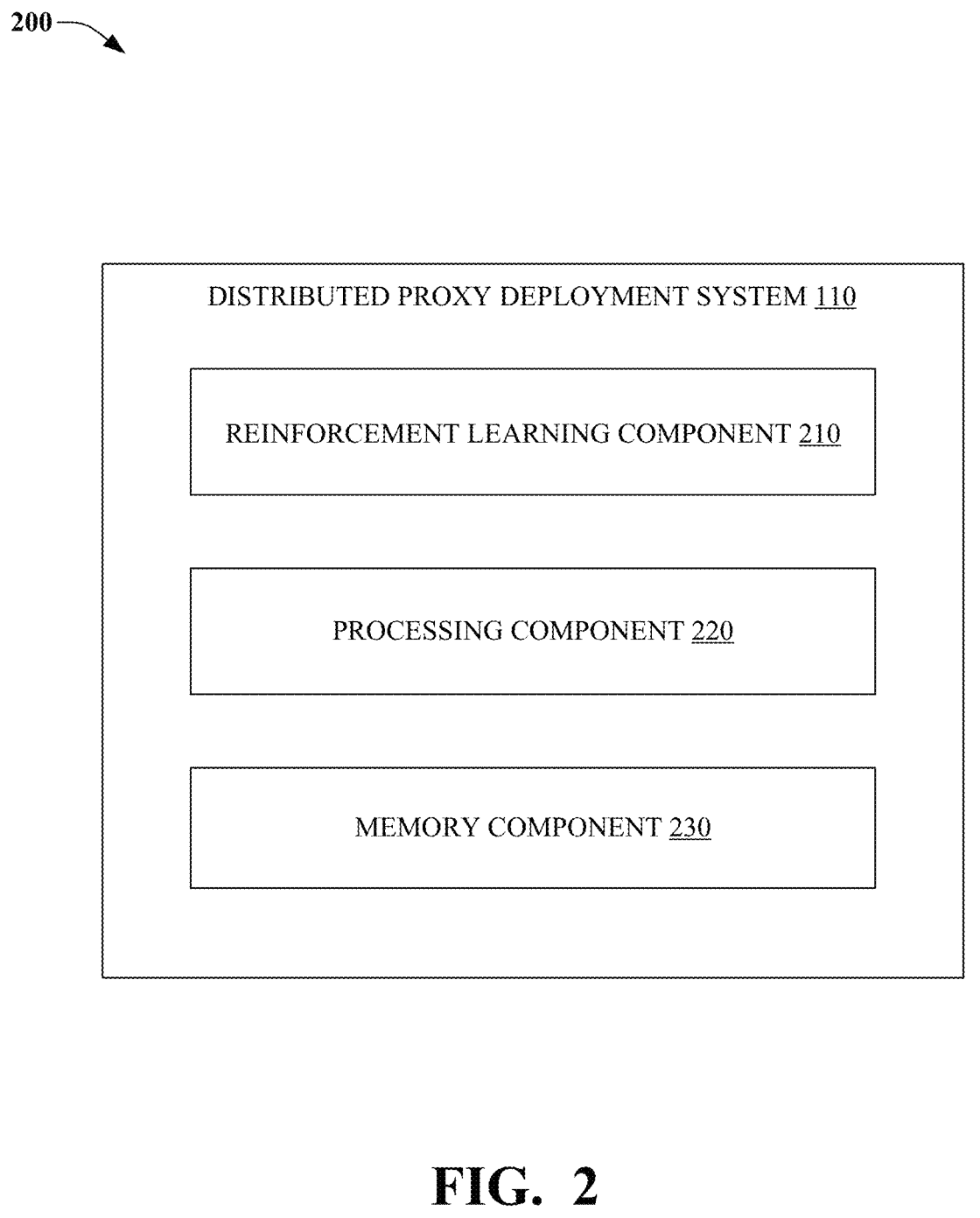

200

DISTRIBUTED PROXY DEPLOYMENT SYSTEM 110

REINFORCEMENT LEARNING COMPONENT 210

PROCESSING COMPONENT 220

MEMORY COMPONENT 230

REINFORCEMENT LEARNING COMPONENT 210

NETWORK AGENT COMPONENT 410

NETWORK REPAIR COMPONENT 420

| Agent Type | Action | State | Reward Metrics |
|---|---|---|---|
| Network | Add/remove proxy nodes | Number of active proxy nodes | Network response times |
| | Redistribute virtual proxies | Distribution of virtual proxies | Job completion times |
| | Adjust load balancing/redistribute proxy nodes | Network latency | Number of retries required |
| | Send proxy node to be repaired | Active count of failed proxy nodes | --- |
| Repair | Attempt to restart/re-initialize proxy node | Proxy node failed | Adequacy of proxy node repair method |
| | Roll back/return to previous proxy node configuration | Proxy node not repaired | Unable to repair proxy node |
| | Isolate proxy node for manual intervention | --- | --- |

800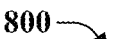

┌─ 810 obtain, by a system comprising a processor, a status of a network comprising a group of proxy nodes that communicate with respective proxy nodes of the group of proxy nodes in a peer-to-peer manner, in which the status represents a current state of the network with respect to respective point-to-point (P2P) communication links between the respective proxy nodes

┌─ 820 based on the status of the network, utilize, by the system, a Q-learning-based reinforcement learning process to facilitate optimization of a future state of the network by modifying, by the system, a proxy selection comprising a selection of proxy nodes to be included in the group of proxy nodes, a distribution of the selection of proxy nodes and/or a group of virtual proxy nodes within a network topology of the network, and/or a load balancing of network traffic, corresponding to the respective P2P communication links, among the distribution of the selection of proxy nodes and/or the group of virtual proxy nodes

FIG. 8

900 —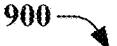

—910 determine, by the system, whether the status of the network represents that a failure has occurred in a proxy node of the group of proxy nodes, in which the status represents health metrics for the proxy node comprising response time, error rate, uptime, and utilization of a resource of the proxy node, and in which the resource comprises a central processing unit or a memory

—920 based on the status of the network, utilize, by the system, a Q-learning-based reinforcement learning process to facilitate optimization of a future state of the network by modifying, by the system, a proxy selection comprising a selection of proxy nodes to be included in the group of proxy nodes, a distribution of the selection of proxy nodes and/or a group of virtual proxy nodes within a network topology of the network, and/or a load balancing of network traffic, corresponding to the respective P2P communication links, among the distribution of the selection of proxy nodes and/or the group of virtual proxy nodes

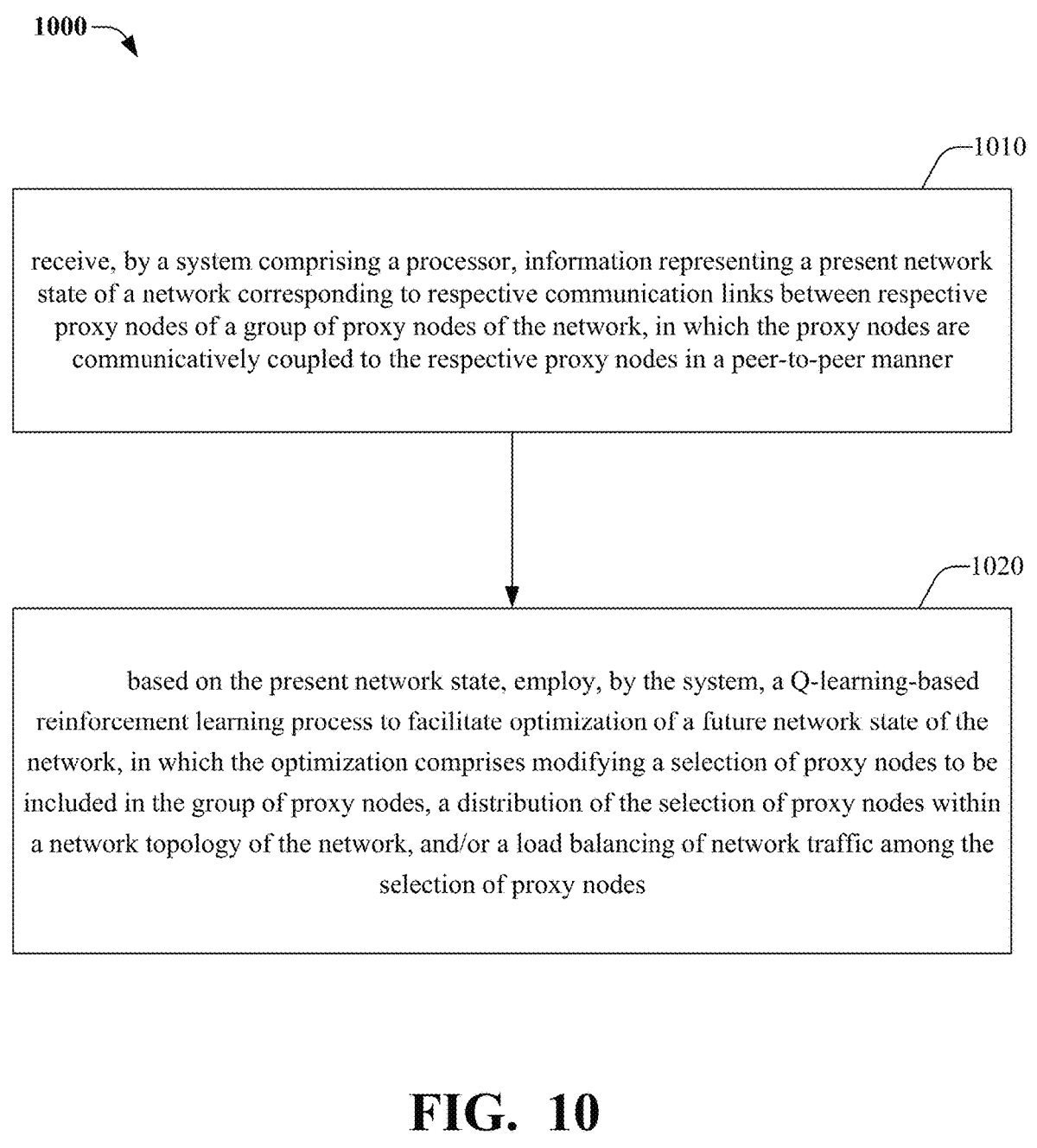

┌─────────────────────────────────────────────────────────────────────┐ ╱—1010
│                                                                     │
│  receive, by a system comprising a processor, information representing a present network │
│  state of a network corresponding to respective communication links between respective │
│  proxy nodes of a group of proxy nodes of the network, in which the proxy nodes are │
│  communicatively coupled to the respective proxy nodes in a peer-to-peer manner │
│                                                                     │
└─────────────────────────────────────────────────────────────────────┘

┌─────────────────────────────────────────────────────────────────────┐ ╱—1020
│                                                                     │
│      based on the present network state, employ, by the system, a Q-learning-based │
│  reinforcement learning process to facilitate optimization of a future network state of the │
│  network, in which the optimization comprises modifying a selection of proxy nodes to be │
│  included in the group of proxy nodes, a distribution of the selection of proxy nodes within │
│  a network topology of the network, and/or a load balancing of network traffic among the │
│                          selection of proxy nodes │
│                                                                     │
└─────────────────────────────────────────────────────────────────────┘

FIG. 10

SELF-HEALING AND DISTRIBUTED PROXY DEPLOYMENT UTILIZING A DECENTRALIZED NETWORK AND REINFORCEMENT LEARNING

TECHNICAL FIELD

The subject disclosure generally relates to embodiments for self-healing and distributed proxy deployment utilizing a decentralized network and reinforcement learning.

BACKGROUND

Conventional proxy management technologies face challenges in terms of scalability, efficiency, reliability, and adaptability. Such technologies are susceptible to single points of failure, which can result in service disruptions and decreased fault tolerance. Furthermore, existing proxy management technologies lack an ability to dynamically adapt to changing network conditions and usage patterns—resulting in suboptimal proxy performance and inefficient proxy-based resource utilization.

BRIEF DESCRIPTION OF THE DRAWINGS

Non-limiting embodiments of the subject disclosure are described with reference to the following Figures, in which like reference numerals refer to like parts throughout the various views unless otherwise specified:

FIG. 2 illustrates a block diagram of a distributed proxy deployment system, in accordance with various example embodiments;

FIG. 6 illustrates a state/action table that is utilized by a network agent component and a repair agent component to facilitate optimization of a network including a group of decentralized proxy nodes, in accordance with various example embodiments;

FIG. 8 illustrates a flow chart of a method associated with a distributed proxy deployment system that utilizes a Q-learning-based reinforcement learning process to facilitate optimization of a network including a group of decentralized proxy nodes, in accordance with various example embodiments;

FIG. 9 illustrates a flow chart of a method associated with a self-healing mechanism of a distributed proxy deployment system that utilizes a Q-learning-based reinforcement learning process to facilitate optimization of a network including a group of decentralized proxy nodes, in accordance with various example embodiments;

FIG. 10 illustrates a flow chart of another method associated with a distributed proxy deployment system that utilizes a Q-learning-based reinforcement learning process to facilitate optimization of a network including a group of decentralized proxy nodes, in accordance with various example embodiments.

DETAILED DESCRIPTION

Figure 1:
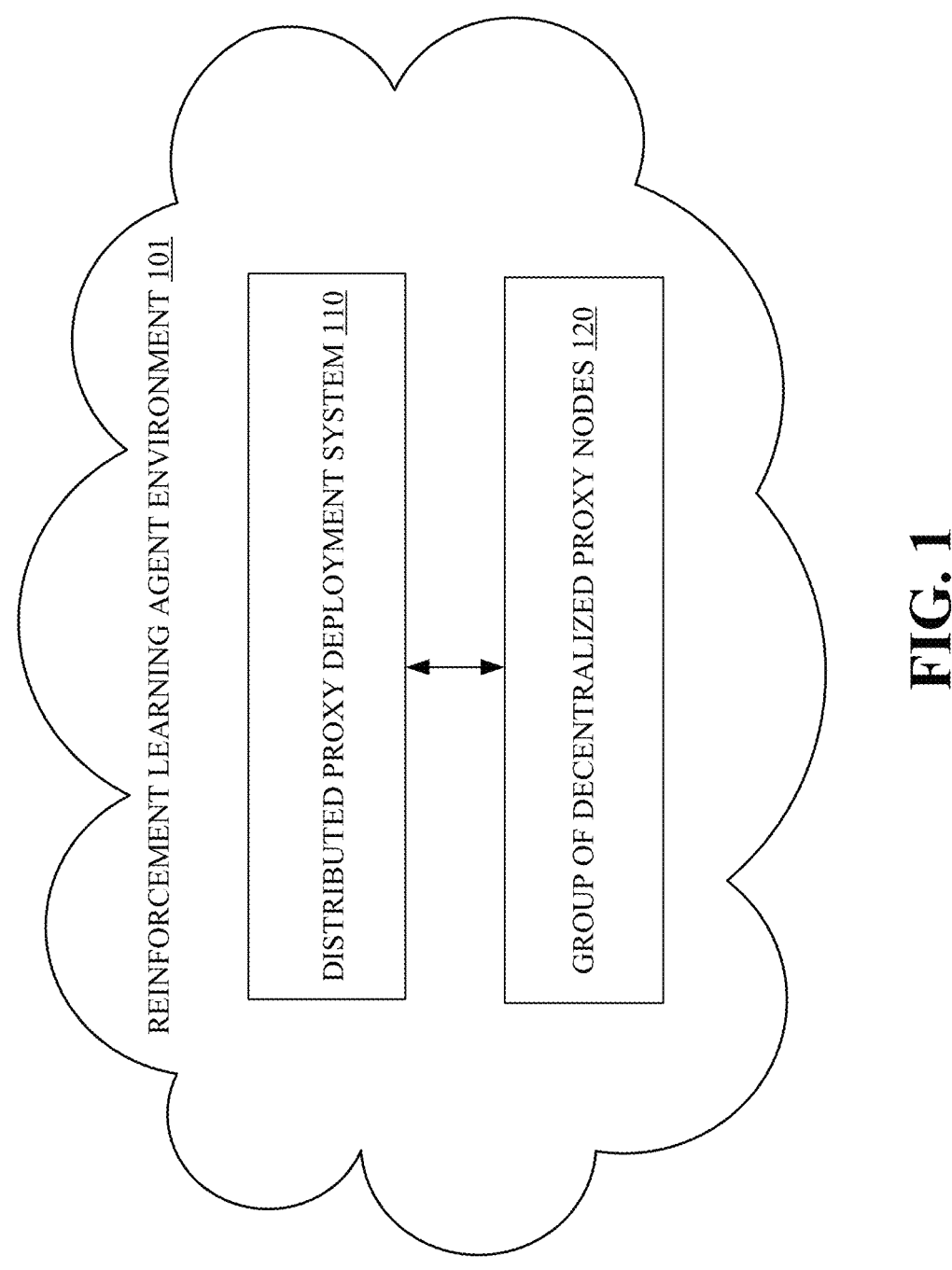
FIG. 1 illustrates a block diagram of a reinforcement learning agent environment including a distributed proxy deployment system that utilizes a Q-learning-based reinforcement learning process to facilitate optimization of a network that includes a group of decentralized proxy nodes, in accordance with various example embodiments.

Aspects of the subject disclosure will now be described more fully hereinafter with reference to the accompanying drawings in which example embodiments are shown. In the following description, for purposes of explanation, numerous specific details are set forth in order to provide a thorough understanding of the various embodiments. However, the subject disclosure may be embodied in many different forms and should not be construed as limited to the example embodiments set forth herein.

As described above, conventional proxy management technologies are susceptible to single points of failure that can result in service disruptions and decreased fault tolerance, and lack an ability to dynamically adapt to changing network conditions and usage patterns-resulting in suboptimal proxy performance and inefficient proxy-based resource utilization. In various embodiments described herein, a distributed proxy deployment system utilizes a Q-learning-based reinforcement learning process to optimize performance of a network including a group of decentralized proxy nodes communicating, in a peer-to-peer manner, with respective proxy nodes.

For example, in embodiment(s), a system, e.g., a distributed proxy deployment system, performs operations comprising: receiving, from respective decentralized proxy nodes of a group of decentralized proxy nodes of a network (e.g., proxy network), information representing a present network state of the network corresponding to respective P2P communication links between the respective decentralized proxy nodes; and based on the present network state, employing a Q-learning-based reinforcement learning process for optimization, associated with a future network state of the network, of a selection of decentralized proxy nodes to be included in the group of decentralized proxy nodes, a distribution of the selection of decentralized proxy nodes within a network topology of the network, and a load balancing, among the selection of decentralized proxy nodes, of network traffic corresponding to the respective P2P communication links.

In other embodiment(s), the distributed proxy deployment system utilizes a self-healing mechanism to automatically detect and repair failure(s) within the network. For example, the distributed proxy deployment system performs operations comprising: in response to the receiving of the information representing the present network state of the network, determining whether the information represents that a failure has occurred in a proxy node of the decentralized proxy nodes, in which the information represents health metrics for the proxy node comprising response time, error rate, uptime, and utilization of a resource of the proxy node, and in which the resource comprises a central processing unit or a memory.

Further, in response to determining that the information represents that the failure has occurred in the proxy node, performing at least one corrective action to facilitate a correction of the failure—the at least one correction action comprises restarting the proxy node, redistributing a portion of the network traffic corresponding to the proxy node to another proxy node of the decentralized proxy nodes, isolating the proxy node from performing operations that are associated with the portion of the network traffic corresponding to the proxy node, or modifying a communication parameter corresponding to the operations.

In yet other embodiments, the distributed proxy deployment system employs an e-greedy (or ε-greedy) strategy to balance exploration and exploitation during the Q-learning-based reinforcement learning process with respect to the optimization of the selection of decentralized proxy nodes to be included in the group of decentralized proxy nodes, the distribution of the selection of decentralized proxy nodes within the network topology, and the load balancing of the network traffic among the selection of decentralized proxy nodes.

For example, the Q-learning-based reinforcement learning process utilizes a first e-greedy-based decision making strategy to select, via a Q-table during a first network state of a group of network states of the network, a first group of actions of the available actions to be performed via the optimization, in which the Q-learning-based reinforcement learning process utilizes a second e-greedy-based decision making strategy to select, via the Q-table during a second network state of the group of network states, a second group of actions of the available actions to be performed via the optimization.

In this regard, the first e-greedy-based decision making strategy utilizes a first epsilon-value (or ε-value) that is less than a second epsilon-value that is utilized by the second e-greedy-based decision making strategy—the first group of actions comprising first actions that have been typically selected by the Q-learning-based reinforcement learning process during the group of network states, the second group of actions comprising second actions that are different from the first group of actions, and the first and second epsilon-values being defined hyperparameters of the system.

In embodiment(s), the distributed proxy deployment system can be employed in different network deployment scenarios—accommodating both virtual machine (VM)-based proxy nodes (e.g., corresponding to an open virtual appliance (OVA)) and containerized nodes (e.g., corresponding to a containerized environment such as Kubernetes).

In other embodiment(s), the distributed proxy deployment system utilizes a user interface (UI) to enable users to monitor and manage the proxy network, including the ability to view real-time network data and statistics, and add/remove proxy nodes and/or virtual proxies.

In yet other embodiment(s), a method comprises: obtaining, by a system comprising a processor, a status of a network comprising a group of proxy nodes that communicate with respective proxy nodes of the group of proxy nodes in a peer-to-peer manner, in which the status represents a current state of the network with respect to respective P2P communication links between the respective proxy nodes; and based on the status of the network, utilizing, by the system, a Q-learning-based reinforcement learning process to facilitate optimization of a future state of the network by modifying, by the system, a proxy selection comprising a selection of proxy nodes to be included in the group of proxy nodes, a distribution of the selection of proxy nodes and/or a group of virtual proxy nodes within a network topology of the network, and/or a load balancing of network traffic, corresponding to the respective P2P communication links, among the distribution of the selection of proxy nodes and/or the group of virtual proxy nodes.

In embodiment(s), a non-transitory machine-readable medium comprises instructions that, in response to execution, cause a system comprising a processor to perform operations, the operations comprising: receiving information representing a present network state of a network corresponding to respective P2P communication links between respective proxy nodes of a group of proxy nodes of the network, in which the proxy nodes are communicatively coupled to the respective proxy nodes in a peer-to-peer manner; and based on the present network state, employing a Q-learning-based reinforcement learning process to facilitate optimization of a future network state of the network, in which the optimization comprises modifying a selection of proxy nodes to be included in the group of proxy nodes, a distribution of the selection of proxy nodes within a network topology of the network, and/or a load balancing of network traffic among the selection of proxy nodes.

Now referring to FIGS. 1-2, a distributed proxy deployment system (110) of a reinforcement learning agent environment (101) includes a reinforcement learning component (210), a processing component (220), and a memory component (230). In embodiment(s), the memory component stores executable instructions that, when executed by the processing component, facilitate performance of operations by the reinforcement learning component (e.g., via a network agent component and a network repair component described below).

Figure 3:
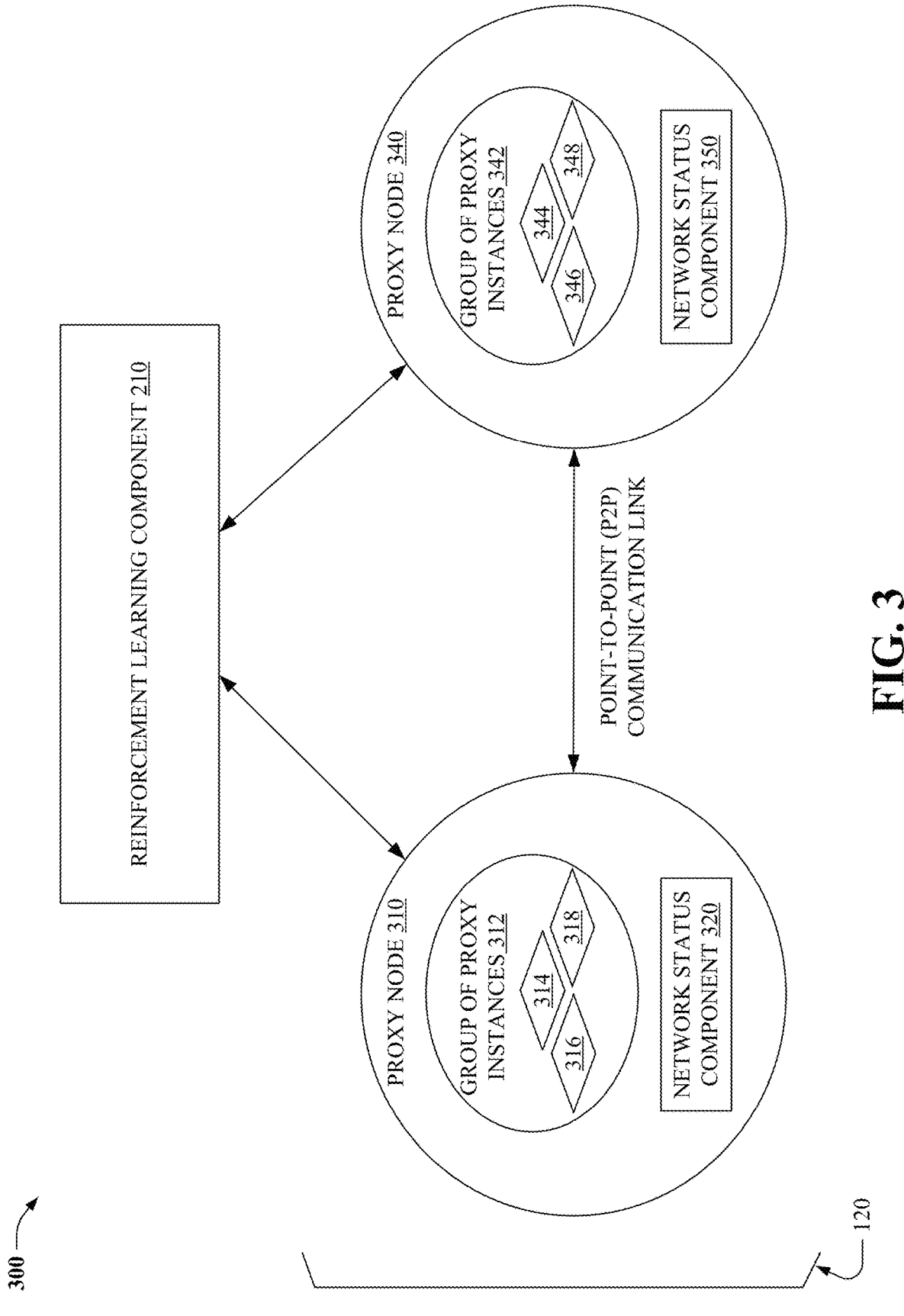
FIG. 3 illustrates a block diagram of a reinforcement learning component that facilitates optimization of a network including a group of decentralized proxy nodes that are communicatively coupled to respective proxy nodes of the group of proxy nodes via point-to-point (P2P) communication links, in accordance with various example embodiments.

In embodiment(s), such operations include receiving, from respective decentralized proxy nodes of a group of decentralized proxy nodes (120) of a network (e.g., of reinforcement learning agent environment 101) information representing a present network state of the network corresponding to respective P2P communication links between the respective decentralized proxy nodes; and based on the present network state, employing a Q-learning-based reinforcement learning process for optimization, associated with a future network state of the network, of a selection of decentralized proxy nodes to be included in the group of decentralized proxy nodes, a distribution of the selection of decentralized proxy nodes within a network topology of the network, and a load balancing, among the selection of decentralized proxy nodes, of network traffic corresponding to the respective P2P communication links, As illustrated by FIG. 3, the group of decentralized proxy nodes includes proxy nodes (310, 340) comprising respective groups (312, 342) of proxy instances (314, 316, 318, 344, 346, 348). In embodiment(s), a proxy node comprises a containerized node or a virtual machine-based proxy node (e.g., virtualized proxy node)—the virtual machine-based proxy node corresponding to an OVA.

The proxy nodes communicate in a peer-to-peer manner, and respective network status components (320, 350) of the proxy nodes monitor status corresponding to the P2P communication links. In this regard, the information representing the present network state of the network includes the status monitored by the proxy nodes. In embodiment(s), the information represents performance metrics of the network, e.g., network conditions, node health, and latency metrics. In various embodiment(s), the performance metrics represent bandwidth, latency, response time, central processing unit (CPU) utilization, memory utilization, error rate, spike(s) in CPU processing and/or memory use, and/or packet drop rate.

In embodiment(s), the respective network status components monitor respective dynamic routing tables of the proxy nodes to obtain the status; and the respective dynamic routing tables are updated based on the status.

In turn, the reinforcement learning component receives, from the respective network status components, the information representing the present network state of the network. Based on the present network state, the reinforcement learning component employs a Q-learning-based reinforcement learning process for optimization, associated with a future network state of the network, of a selection of decentralized proxy nodes to be included in the group of decentralized proxy nodes, a distribution of the selection of decentralized proxy nodes within a network topology of the network, and a load balancing, among the selection of decentralized proxy nodes, of network traffic corresponding to the respective P2P communication links.

Figure 4:
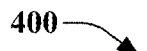
FIG. 4 illustrates a block diagram of a reinforcement learning component that includes a network agent component and a repair agent component, in accordance with various example embodiments.
Figure 5:
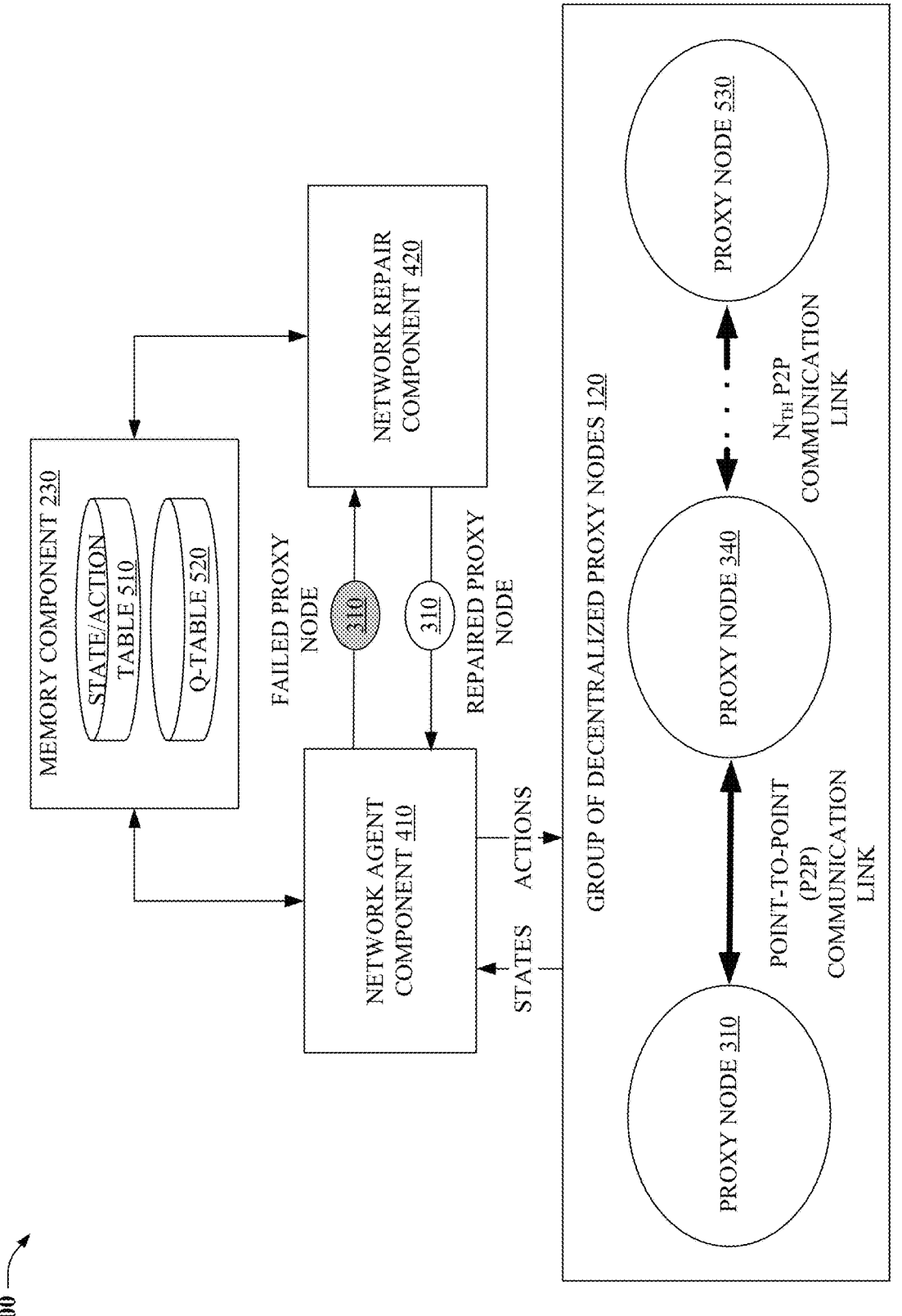
FIG. 5 illustrates a block diagram of a network agent component and a network repair component facilitating repair of a failed proxy node, in accordance with various example embodiments.

Now referring to FIGS. 4-6, the Q-learning-based reinforcement learning process is based on Q-learning-a model-free, value-based reinforcement learning algorithm that enables an agent (e.g., network agent component 410, network repair component 420) to learn an optimal action-selection policy for any given finite Markov decision process. In the context of the distributed proxy deployment system, the network agent component learns to dynamically make decisions, e.g., select and perform actions, regarding proxy selection, distribution, and load balancing based on the present network state/network conditions and usage patterns corresponding to the respective P2P communication links.

In embodiment(s), the reinforcement learning component employs the Q-learning-based reinforcement learning process for the optimization by employing a Q-learning-based hierarchical reinforcement learning algorithm/process via two levels. At a first level, a main agent (e.g., network agent, network agent component 410) optimizes proxy selection, distribution, and load balancing in real-time-based on the present network state/network conditions and usage patterns. For example, in response to identifying, based on a query of the present network state/network conditions and usage patterns, that proxy node(s) have failed (e.g., become inoperable), the network agent component sends/directs such failed node(s) to a secondary agent (e.g., repair agent, repair agent component 420) for repair, e.g., at a second level, via the repair agent component with respect to isolating, disabling, and/or quarantining the failed node(s) (e.g., 310).

In this regard, the repair agent component attempts to repair (e.g., restart, re-instantiate) the failed node(s), and in response to the repair agent component successfully repairing the failed node(s), the repair agent component sends/directs repaired failed node(s) to the network agent component to enable, rejoin, and/or integrate the repaired failed node(s) into the group (120) of decentralized proxy nodes (310, 340, 530). In this way, the reinforcement learning component can continuously analyze network data and repair proxy nodes, adjust the distribution of the proxy nodes within the network, and add/remove virtualized proxy nodes within the network to ensure optimal network performance and resource utilization.

The Q-learning-based hierarchical reinforcement learning algorithm/process represents, e.g., via a data store (e.g., state/action table 510), the present network state/network conditions using a combination of variables that capture relevant information about the present network state/network conditions and the usage patterns.

In various embodiment(s), the state/action table characterizes a state representation of the network via performance metrics that represent the present network state/network conditions and usage patterns, an action space of the network representing available actions to affect the optimization of the proxy selection, and reward metrics that promote respective actions of the available actions. In turn, based on the state representation, the action space, and the reward metrics, the reinforcement learning component modifies the selection of decentralized proxy nodes, the distribution of the selection of decentralized proxy nodes, and/or the load balancing of the network traffic.

In embodiment(s), the performance metrics comprise: a number of decentralized proxy nodes that are actively operating in the network, a distribution of virtualized proxies among the decentralized proxy nodes, and network latency corresponding to the respective P2P communication links.

In other embodiment(s), the reward metrics comprise: respective network response times, proxy node resource allocation, and a stability of the system with respect to the network traffic.

In yet other embodiment(s), the action space comprises: a first modification of the selection of decentralized proxy nodes, e.g., adding at least one proxy node to the group of decentralized proxy nodes or removing the at least one proxy node from the group of decentralized proxy nodes; a second modification of the distribution of the selection of decentralized proxy nodes, e.g., redistributing a first portion of the decentralized proxy nodes from a first portion of the network topology to a second portion of the network topology, or redistributing virtualized proxies among the group of decentralized proxy nodes; and a third modification of the load balancing of the network traffic, e.g., distributing the network traffic across the selection of decentralized proxy nodes to prevent overloading of traffic on at least one decentralized proxy node of the selection of decentralized proxy nodes.

In embodiment(s), the reinforcement learning component utilizes a reward function to evaluate the effectiveness of its actions corresponding to performance of the optimization, e.g., based on metric(s) including job success rate, job completion time, and a number of retries of P2P communications. For example, a proxy node being determined, e.g., via the network agent component, to consistently underperform in at least one of the metric(s) can be identified as a problematic proxy node, and the network agent component can send/direct the problematic proxy node (e.g., 310 as illustrated by FIG. 5) to the repair agent component for repair.

In another example, e.g., in response to the problematic proxy node being determined, via the repair agent component, to be unable to be repaired, or being determined to consistently underperform in at least one of the metric(s), the network proxy agent can redirect network traffic to other, healthy nodes of the group of decentralized proxy nodes, or facilitate instantiation of new proxy node(s) within the network. In this regard, the reward function promotes, utilizing the state/action table, actions of the action space that improve network performance, minimize latency and packet loss, maximize throughput, and maintain system reliability.

The reinforcement learning component maintains a Q-Table 520 to store estimated Q-values for each state-action pair, e.g., represented by state/action table 510. In embodiment(s), the employing of the Q-learning-based reinforcement learning process comprises: generating, via a data store (e.g., memory component 230), the Q-table, which stores respective Q-values for state-action pairs comprising respective states and respective actions. In embodiment(s), the respective states comprise a number of decentralized proxy nodes that are actively operating in the network, a distribution of virtualized proxies among the decentralized proxy nodes, and a network latency corresponding to the respective P2P communication links. Further, the respective actions comprise a modification of a selection of decentralized proxy nodes to be included in the group of decentralized proxy nodes, a modification of a distribution of the selection of decentralized proxy nodes with the network, and a modification of a load balancing of the network traffic among the selection of decentralized proxy nodes.

In turn, the employing of the Q-learning-based reinforcement learning process further comprises: successively receiving, from the group of decentralized proxy nodes, successive information representing respective successive states of the network corresponding to the respective P2P communication links; based on the respective successive states of the network, incrementally modifying the Q-values for the state-action pairs; and based on the Q-values, performing the optimization.

The Q-values represent an expected cumulative reward for taking a particular action in a given state. During the learning process, the algorithm updates the Q-table using a Q-learning update rule defined by equation (1) as follows:

$$Q(s, a) = \mathbb{E}\left[R_{t+1} + \gamma \max_{a'}\left(Q(S_{t+1}, a')|S_t = s, A_t = a\right)\right] \quad (1)$$

in which:
s is the current state at time t
a is the chosen action at time t
R is the reward received after taking action a in state s at time t
γ is the discount factor
s' is the state at time t+1 after taking action a
a' is the action chosen in state s' at time t+1.

The reinforcement learning component updates the Q-values based on the observed rewards and transitions between states, and based on an expected value of future rewards, eventually converges to an optimal action-selection policy. The network agent and the repair agent utilize the learning strategy defined by equation (1) in their respective learning environments.

In other embodiment(s), the reinforcement learning component employs the Q-learning-based reinforcement learning process for the optimization by utilizing a first e-greedy-based decision making strategy to select, via the Q-table during a first network state of a group of network states of the network, a first group of actions of the available actions to be performed via the optimization. Further, the Q-learning-based reinforcement learning process utilizes a second e-greedy-based decision making strategy to select, via the Q-table during a second network state of the group of network states, a second group of actions of the available actions to be performed via the optimization.

The first e-greedy-based decision making strategy utilizes a first epsilon-value that is less than a second-epsilon value that is used by the second e-greedy-based decision making strategy—the first and second epsilon-values comprising hyperparameters of the distributed proxy deployment system. Further, the first group of actions comprise first actions that have been typically selected by the Q-learning-based reinforcement learning process during the group of network states, and the second group of actions comprise second actions that are different from the first group of actions, e.g., actions that have not been previously performed on the network.

The Q-learning-based reinforcement learning process balances exploration and exploitation, in which exploration involves trying new actions to discover their effects, while exploitation focuses on choosing best-known actions based on current Q-values of the Q-table. In this regard, the Q-learning-based reinforcement learning process uses an ε-greedy strategy to manage this trade-off, in which it selects a random action with a probability ε, and a best-known action with a probability of 1−ε.

For example, in embodiment(s), the Q-learning-based reinforcement learning process utilizes exploitation in selecting the first group of actions of the available actions to be performed via the optimization (e.g., by utilizing the first epsilon-value during the first e-greedy-based decision making strategy described above) in response to determining that recent actions (or a group of actions) that have been performed by the Q-learning-based reinforcement process have resulted in suboptimal performance of the system, e.g., over a defined period of time.

Further, in other embodiment(s), the Q-learning-based reinforcement learning process utilizes exploration in selecting the second group of actions of the available actions to be performed via the optimization (e.g., by utilizing the second epsilon-value during the second e-greedy-based decision making strategy described above) in response to determining that few or no actions have previously been performed by the Q-learning-based reinforcement process with respect to the optimization.

In other embodiment(s), the employing of the Q-learning-based hierarchical reinforcement learning algorithm/process further comprises automatically detecting and repairing, via a self-healing mechanism, failures within the network, e.g., to facilitate high availability, reliability, and fault tolerance. In this regard, the Q-learning-based hierarchical reinforcement learning algorithm/process analyzes network conditions, identifies failures within the proxy network, and automatically redirects traffic to healthy nodes in the event of a detected failure. For example, in embodiment(s), in response to the receiving of information representing a present network state of the network, the reinforcement learning component determines whether the information represents that a failure has occurred in a proxy node of the decentralized proxy nodes—the information representing health metrics for the proxy node comprising response time, error rate, uptime, and/or utilization of a resource (e.g., a central processing unit or a memory) of the proxy node.

Further, in response to determining that the information represents that the failure has occurred in the proxy node, the reinforcement learning component performs at least one corrective action to facilitate a correction of the failure. In embodiment(s), the at least one correction action comprises restarting the proxy node, redistributing a portion of the network traffic corresponding to the proxy node to another proxy node of the decentralized proxy nodes, isolating the proxy node from performing operations that are associated with the portion of the network traffic corresponding to the proxy node, or modifying a communication parameter corresponding to the operations.

In embodiment(s), the employing of the Q-learning-based hierarchical reinforcement learning algorithm/process further comprises automatically adjusting a load-balancing strategy based on real-time conditions and usage patterns, e.g., distributing the network traffic across the selection of decentralized proxy nodes, e.g., to prevent overloading of traffic on at least one decentralized proxy node of the selection of decentralized proxy nodes, and/or to adapt to determined fluctuations in network traffic or an availability of proxy nodes.

Figure 7:
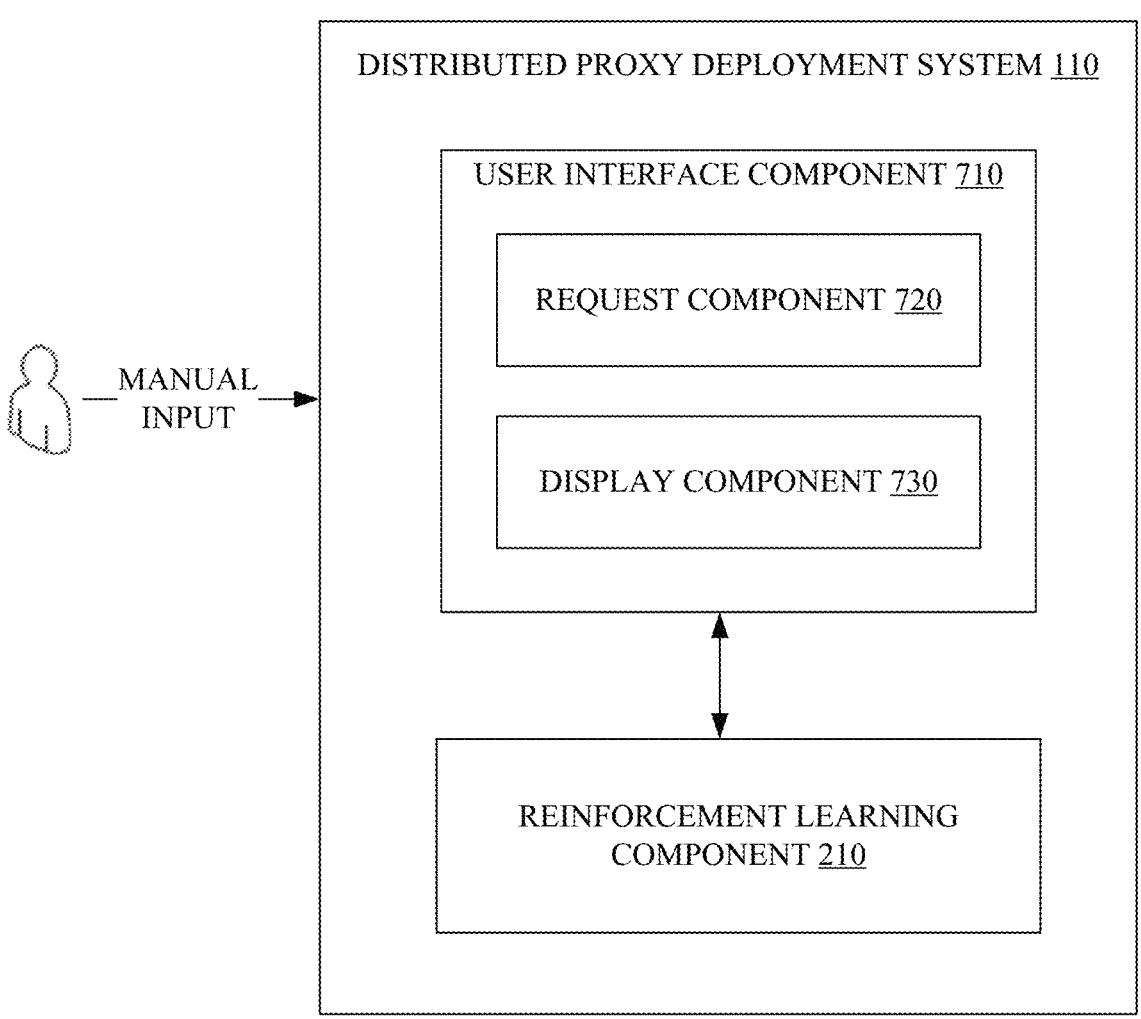
FIG. 7 illustrates a user interface (UI) component of a distributed proxy deployment system that facilitates a performance, based on a request that has been received by the UI component from a user of the distributed proxy deployment system, of an action corresponding to a group of decentralized proxy nodes of the distributed proxy deployment system, in accordance with various example embodiments.

Referring now to FIG. 7, the distributed proxy deployment system comprises a user interface component 710 for monitoring and managing the proxy network. The user interface component enables users to view real-time network data and statistics, as well as add and remove proxy nodes and virtual proxies as needed. In embodiment(s), the user interface component receives, from a user via a request component 720, a request (e.g., manual input) to perform an action. In embodiment(s), the action includes displaying, e.g., via display component 730, at least a portion of the information representing the present network state of the network; adding or removing a proxy node of the group of decentralized proxy nodes; adding or removing a virtualized proxy of the proxy node; or modifying a configuration of at least one of the proxy node or the virtualized proxy node based on a parameter of the configuration that has been received, from the user, via another request. In turn, based on the request, the reinforcement learning component can perform the action.

FIGS. 8-10 illustrate methodologies in accordance with the disclosed subject matter. For simplicity of explanation, the methodologies are depicted and described as a series of acts. It is to be understood and appreciated that various embodiments disclosed herein are not limited by the acts illustrated and/or by the order of acts. For example, acts can occur in various orders and/or concurrently, and with other acts not presented or described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 8 illustrates a flow chart (800) of a method associated with a system (e.g., 110) that utilizes a Q-learning-based reinforcement learning process to facilitate optimization of a network including a group of decentralized proxy nodes (120), in accordance with various example embodiments. At 810, the system obtains a status of a network comprising a group of proxy nodes that communicate with respective proxy nodes of the group of proxy nodes in a peer-to-peer manner, in which the status represents a current state of the network with respect to respective P2P communication links between the respective proxy nodes.

At 820, based on the status of the network, the system utilizes a Q-learning-based reinforcement learning process to facilitate optimization of a future state of the network by modifying a proxy selection comprising a selection of proxy nodes to be included in the group of proxy nodes, a distribution of the selection of proxy nodes and/or a group of virtual proxy nodes within a network topology of the network, and/or a load balancing of network traffic, corresponding to the respective P2P communication links, among the distribution of the selection of proxy nodes and/or the group of virtual proxy nodes.

FIG. 9 illustrates a flow chart (900) of a method associated with a self-healing mechanism of a system (e.g., 110) that utilizes a Q-learning-based reinforcement learning process to facilitate optimization of a network including a group of decentralized proxy nodes, in accordance with various example embodiments. At 910, the system determines whether the status of the network represents that a failure has occurred in a proxy node of the group of proxy nodes, in which the status represents health metrics for the proxy node comprising response time, error rate, uptime, and utilization of a resource of the proxy node, and in which the resource comprises a central processing unit or a memory.

At 920, based on the status of the network, the system utilizes a Q-learning-based reinforcement learning process to facilitate optimization of a future state of the network by modifying a proxy selection comprising a selection of proxy nodes to be included in the group of proxy nodes, a distribution of the selection of proxy nodes and/or a group of virtual proxy nodes within a network topology of the network, and/or a load balancing of network traffic, corresponding to the respective P2P communication links, among the distribution of the selection of proxy nodes and/or the group of virtual proxy nodes.

FIG. 10 illustrates a flow chart (1000) of another method associated with a system (e.g., 110) that utilizes a Q-learning-based reinforcement learning process to facilitate optimization of a network including a group of decentralized proxy nodes, in accordance with various example embodiments.

At 1010, the system receives information representing a present network state of a network corresponding to respective communication links between respective proxy nodes of a group of proxy nodes of the network, in which the proxy nodes are communicatively coupled to the respective proxy nodes in a peer-to-peer manner.

At 1020, based on the present network state, the system employs a Q-learning-based reinforcement learning process to facilitate optimization of a future network state of the network, in which the optimization comprises modifying a selection of proxy nodes to be included in the group of proxy nodes, a distribution of the selection of proxy nodes within a network topology of the network, and/or a load balancing of network traffic among the selection of proxy nodes.

Reference throughout this specification to "one embodiment," "an embodiment," "another embodiment", "yet another embodiment", "embodiment(s)", "other "embodiment(s)", and "yet other embodiment(s)" means that a particular feature, structure, or characteristic described in connection with the embodiment is included in at least one embodiment. Thus, the appearances of the phrase "in one embodiment," "in an embodiment," "in another embodiment", "in yet another embodiment", "in embodiment(s)", "in other embodiment(s)", and "in yet other embodiment(s)" in various places throughout this specification are not necessarily all referring to the same embodiment. Furthermore, the particular features, structures, or characteristics may be combined in any suitable manner in one or more embodiments.

Furthermore, to the extent that the terms "includes," "has," "contains," and other similar words are used in either the detailed description or the appended claims, such terms are intended to be inclusive—in a manner similar to the term "comprising" as an open transition word-without precluding any additional or other elements. Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As utilized herein, terms "component", "system", and the like are intended to refer to a computer-related entity, hardware, software (e.g., in execution), middleware, and/or firmware. For example, a component can be a processor, a process running on a processor, an object, an executable, a program, a storage device, and/or a computer. By way of illustration, an application running on a server, client, etc. and the server, client, etc. can be a component. One or more components can reside within a process, and a component can be localized on one computer and/or distributed between two or more computers.

Further, components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. In yet another example, a component can be an apparatus that provides specific functionality through electronic components without mechanical parts; the electronic components can comprise one or more processors therein to execute software and/or firmware that confer(s), at least in part, the functionality of the electronic components.

Aspects of systems, apparatus, and processes explained herein can constitute machine-executable instructions embodied within a machine, e.g., embodied in a computer readable medium (or media) associated with the machine. Such instructions, when executed by the machine, can cause the machine to perform the operations described. Additionally, the systems, processes, process blocks, etc. can be embodied within hardware, such as an application specific integrated circuit (ASIC) or the like. Moreover, the order in which some or all of the process blocks appear in each process should not be deemed limiting. Rather, it should be understood by a person of ordinary skill in the art having the benefit of the instant disclosure that some of the process blocks can be executed in a variety of orders not illustrated.

Furthermore, the word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art having the benefit of the instant disclosure.

The disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can comprise, but are not limited to: random access memory (RAM); read only memory (ROM); electrically erasable programmable read only memory (EEPROM); flash memory or other memory technology (e.g., card, stick, key drive, thumb drive, smart card); solid state drive (SSD) or other solid-state storage technology; optical disk storage (e.g., compact disk (CD) read only memory (CD ROM), digital video/versatile disk (DVD), Blu-ray disc); cloud-based (e.g., Internet based) storage; magnetic storage (e.g., magnetic cassettes, magnetic tape, magnetic disk storage or other magnetic storage devices); a virtual device/virtualized device that emulates a storage device and/or any of the above computer-readable media; or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

As it is employed in the subject specification, the term "processing component" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "data storage", "data store", "storage space", "data storage device", "storage medium", "memory component", and substantially any other information storage component relevant to operation and functionality of a system, component, and/or process, can refer to "memory components," or entities embodied in a "memory," or components comprising the memory. It will be appreciated that the memory components described herein can be either volatile memory or nonvolatile memory, or can comprise both volatile and nonvolatile memory.

By way of illustration, and not limitation, nonvolatile memory, for example, can be included in a memory component (230), non-volatile memory 1122 (see below), disk storage 1124 (see below), and/or memory storage 1146 (see below). Further, nonvolatile memory can be included in read only memory (ROM), programmable ROM (PROM), electrically programmable ROM (EPROM), electrically erasable ROM (EEPROM), or flash memory. Volatile memory (e.g., 1120) can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DR-RAM). Additionally, the disclosed memory components of systems or methods herein are intended to comprise, without being limited to comprising, these and any other suitable types of memory.

Figure 11:
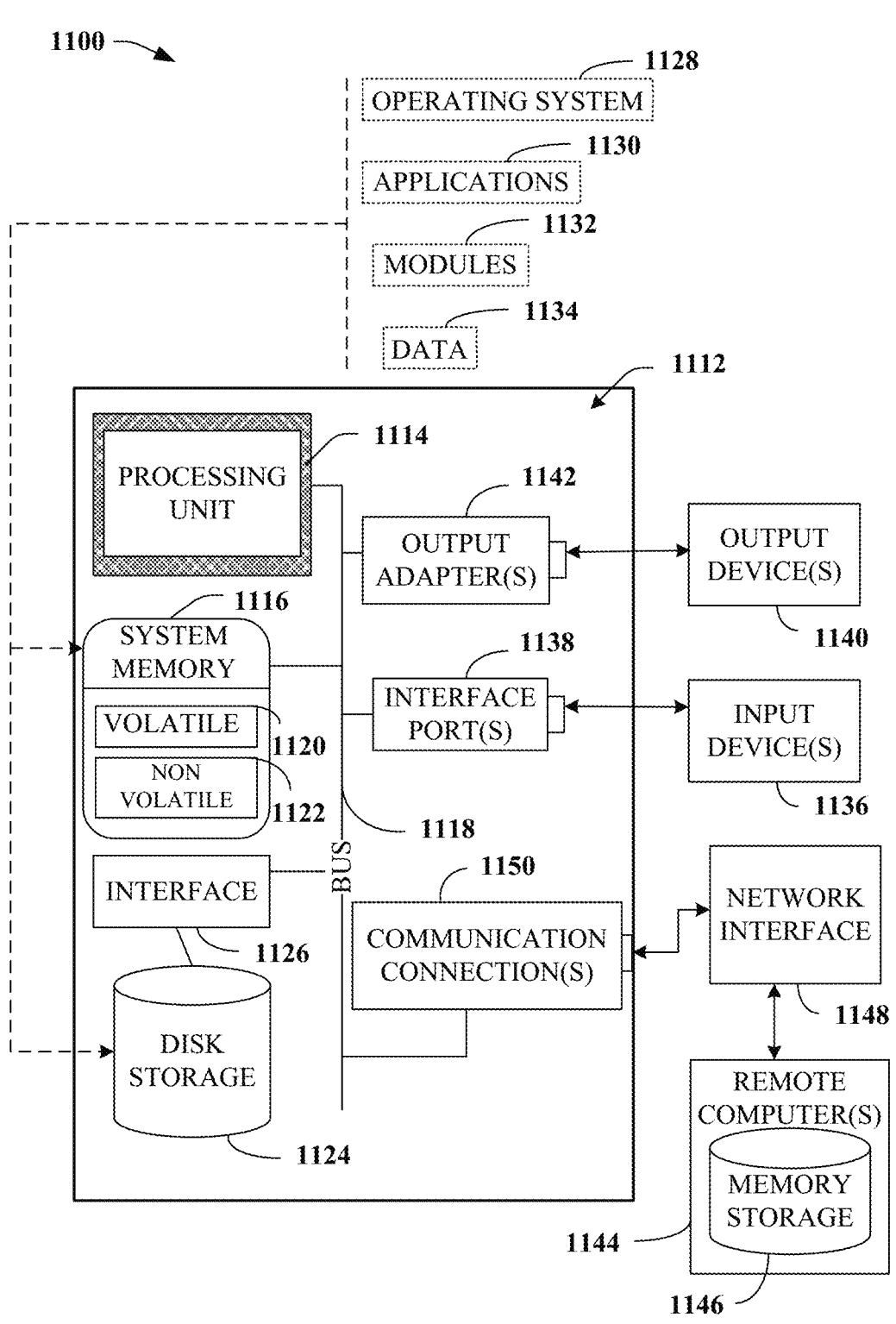
FIG. 11 illustrates a block diagram representing an illustrative non-limiting computing system or operating environment in which one or more aspects of various embodiments described herein can be implemented.

In order to provide a context for the various aspects of the disclosed subject matter, FIG. 11, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that various embodiments disclosed herein can be implemented in combination with other program modules. Generally, program modules comprise routines, programs, components, data structures, etc. that perform particular tasks and/or implement particular abstract data types.

Moreover, those skilled in the art will appreciate that the inventive systems can be practiced with other computer system configurations, comprising single-processor or multiprocessor computer systems, computing devices, minicomputing devices, mainframe computers, as well as personal computers, hand-held computing devices (e.g., PDA, phone, watch), microprocessor-based or programmable consumer or industrial electronics, and the like. The illustrated aspects can also be practiced in distributed computing environments where tasks are performed by remote processing devices that are linked through a communication network; however, some if not all aspects of the subject disclosure can be practiced on stand-alone computers. In a distributed computing environment, program modules can be located in both local and remote memory storage devices.

With reference to FIG. 11, a block diagram of a computing system 1100 operable to execute the disclosed systems and methods, e.g., via reinforcement learning agent environment (101), is illustrated, in accordance with an embodiment. Computer 1112 comprises a processing unit 1114, a system memory 1116, and a system bus 1118. System bus 1118 couples system components comprising, but not limited to, system memory 1116 to processing unit 1114. Processing unit 1114 can be any of various available processors. Dual microprocessors and other multiprocessor architectures also can be employed as processing unit 1114.

System bus 1118 can be any of several types of bus structure(s) comprising a memory bus or a memory controller, a peripheral bus or an external bus, and/or a local bus using any variety of available bus architectures comprising, but not limited to, industrial standard architecture (ISA), micro-channel architecture (MSA), extended ISA (EISA), intelligent drive electronics (IDE), VESA local bus (VLB), peripheral component interconnect (PCI), card bus, universal serial bus (USB), advanced graphics port (AGP), personal computer memory card international association bus (PCMCIA), Firewire (IEEE 1394), small computer systems interface (SCSI), and/or controller area network (CAN) bus used in vehicles.

System memory 1116 comprises volatile memory 1120 and nonvolatile memory 1122. A basic input/output system (BIOS), containing routines to transfer information between elements within computer 1112, such as during start-up, can be stored in nonvolatile memory 1122. By way of illustration, and not limitation, nonvolatile memory 1122 can comprise ROM, PROM, EPROM, EEPROM, or flash memory. Volatile memory 1120 comprises RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1112 also comprises removable/non-removable, volatile/non-volatile computer storage media. FIG. 11 illustrates, for example, disk storage 1124. Disk storage 1124 comprises, but is not limited to, devices like a magnetic disk drive, floppy disk drive, tape drive, Jaz drive, Zip drive, LS-100 drive, flash memory card, or memory stick. In addition, disk storage 1124 can comprise storage media separately or in combination with other storage media comprising, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to system bus 1118, a removable or non-removable interface is typically used, such as interface 1126.

It is to be appreciated that FIG. 11 describes software that acts as an intermediary between users, e.g., subscribers, and computer resources described in suitable operating environment 1100. Such software comprises an operating system 1128. Operating system 1128, which can be stored on disk storage 1124, acts to control and allocate resources of computer system 1112. System applications 1130 take advantage of the management of resources by operating system 1128 through program modules 1132 and program data 1134 stored either in system memory 1116 or on disk storage 1124. It is to be appreciated that the disclosed subject matter can be implemented with various operating systems or combinations of operating systems.

A user, e.g., subscriber, can enter commands or information into computer 1112 through input device(s) 1136. Input devices 1136 comprise, but are not limited to, a pointing device such as a mouse, trackball, stylus, touch pad, keyboard, microphone, joystick, game pad, satellite dish, scanner, TV tuner card, digital camera, digital video camera, web camera, cellular phone, user equipment, smartphone, and the like. These and other input devices connect to processing unit 1114 through system bus 1118 via interface port(s) 1138. Interface port(s) 1138 comprise, for example, a serial port, a parallel port, a game port, a universal serial bus (USB), a wireless based port, e.g., Wi-Fi, Bluetooth, etc. Output device(s) 1140 use some of the same type of ports as input device(s) 1136.

Thus, for example, a USB port can be used to provide input to computer 1112 and to output information from computer 1112 to an output device 1140. Output adapter 1142 is provided to illustrate that there are some output devices 1140, like display devices, light projection devices, monitors, speakers, and printers, among other output devices 1140, which use special adapters. Output adapters 1142 comprise, by way of illustration and not limitation, video and sound devices, cards, etc. that provide means of connection between output device 1140 and system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. Remote computer(s) 1144 can be a personal computer, a server, a router, a network PC, a workstation, a microprocessor based appliance, a peer device, or other common network node and the like, and typically comprises many or all of the elements described relative to computer 1112.

For purposes of brevity, only a memory storage device 1146 is illustrated with remote computer(s) 1144. Remote computer(s) 1144 is logically connected to computer 1112 through a network interface 1148 and then physically and/or wirelessly connected via communication connection 1150. Network interface 1148 encompasses wire and/or wireless communication networks such as local-area networks (LAN) and wide-area networks (WAN). LAN technologies comprise fiber distributed data interface (FDDI), copper distributed data interface (CDDI), Ethernet, token ring and the like. WAN technologies comprise, but are not limited to, point-to-point links, circuit switching networks like integrated services digital networks (ISDN) and variations thereon, packet switching networks, and digital subscriber lines (DSL).

Communication connection(s) 1150 refer(s) to hardware/software employed to connect network interface 1148 to bus 1118. While communication connection 1150 is shown for illustrative clarity inside computer 1112, it can also be external to computer 1112. The hardware/software for connection to network interface 1148 can comprise, for example, internal and external technologies such as modems, comprising regular telephone grade modems, cable modems and DSL modems, wireless modems, ISDN adapters, and Ethernet cards.

The computer 1112 can operate in a networked environment using logical connections via wired and/or wireless communications to one or more remote computers, cellular based devices, user equipment, smartphones, or other computing devices, such as workstations, server computers, routers, personal computers, portable computers, microprocessor-based entertainment appliances, peer devices or other common network nodes, etc. The computer 1112 can connect to other devices/networks by way of antenna, port, network interface adaptor, wireless access point, modem, and/or the like.

The computer 1112 is operable to communicate with any wireless devices or entities operatively disposed in wireless communication, e.g., a printer, scanner, desktop and/or portable computer, portable data assistant, communications satellite, user equipment, cellular base device, smartphone, any piece of equipment or location associated with a wirelessly detectable tag (e.g., scanner, a kiosk, news stand, restroom), and telephone. This comprises at least Wi-Fi and Bluetooth wireless technologies. Thus, the communication can be a predefined structure as with a conventional network or simply an ad hoc communication between at least two devices.

Wi-Fi allows connection to the Internet from a desired location (e.g., a vehicle, couch at home, a bed in a hotel room, or a conference room at work, etc.) without wires. Wi-Fi is a wireless technology similar to that used in a cell phone that enables such devices, e.g., mobile phones, computers, etc., to send and receive data indoors and out, anywhere within the range of a base station. Wi-Fi networks use radio technologies called IEEE 802.11 (a, b, g, etc.) to provide secure, reliable, fast wireless connectivity. A Wi-Fi network can be used to connect communication devices (e.g., mobile phones, computers, etc.) to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:

at least one processor; and at least one memory that stores executable components that, when executed by the at least one processor, facilitate performance of operations by the system, the operations comprising:

receiving, from respective decentralized proxy nodes of a group of decentralized proxy nodes of a network, information representing a present network state of the network corresponding to respective point-to-point (P2P) communication links between the respective decentralized proxy nodes; and based on the present network state, employing a Q-learning-based reinforcement learning process for optimization, associated with a future network state of the network, of a selection of decentralized proxy nodes to be included in the group of decentralized proxy nodes, a distribution of the selection of decentralized proxy nodes within a network topology of the network, and a load balancing, among the selection of decentralized proxy nodes, of network traffic corresponding to the respective P2P communication links, wherein the Q-learning-based reinforcement learning process utilizes respective e-greedy-based decision making strategies to select, during respective states of the network via a Q-table based on respective epsilon-values that are respective defined hyperparameters of the system, respective groups of actions to be performed via the optimization.

2. The system of claim 1, wherein the respective decentralized proxy nodes communicate with other respective decentralized proxy nodes of the group of decentralized proxy nodes in a peer-to-peer manner, wherein the respective decentralize proxy nodes monitor respective status corresponding to the respective P2P communication links, and wherein the information comprises the respective status corresponding to the respective P2P communication links.

3. The system of claim 1, wherein the employing of the Q-learning-based reinforcement learning process comprises:
representing, via a data store,
a state representation of the network via performance metrics that represent network conditions of the network and usage patterns of the network,
an action space of the network representing available actions to affect the optimization of the proxy selection, and
reward metrics that promote respective actions of the available actions; and
based on the state representation, the action space, and the reward metrics, modifying at least one of the selection of decentralized proxy nodes, the distribution of the selection of decentralized proxy nodes, or the load balancing of the network traffic.

4. The system of claim 3, wherein the performance metrics comprise:
a number of decentralized proxy nodes that are actively operating in the network, a distribution of virtualized proxies among the decentralized proxy nodes, and network latency corresponding to the respective P2P communication links.

5. The system of claim 3, wherein the reward metrics comprise:
respective network response times, proxy node resource allocation, and a stability of the system with respect to the network traffic.

6. The system of claim 3, wherein the action space comprises:
a first modification of the selection of decentralized proxy nodes, a second modification of the distribution of the selection of decentralized proxy nodes, and a third modification of the load balancing of the network traffic.

7. The system of claim 6, wherein the first modification of the selection of decentralized proxy nodes comprises:
adding at least one proxy node to the group of decentralized proxy nodes or removing the at least one proxy node from the group of decentralized proxy nodes.

8. The system of claim 6, wherein the second modification of the distribution of the selection of decentralized proxy nodes comprises:
redistributing a first portion of the decentralized proxy nodes from a first portion of the network topology to a second portion of the network topology, or
redistributing virtualized proxies among the group of decentralized proxy nodes.

9. The system of claim 6, wherein the third modification of the load balancing of the network traffic comprises:
distributing the network traffic across the selection of decentralized proxy nodes to prevent overloading of traffic on at least one decentralized proxy node of the selection of decentralized proxy nodes.

10. The system of claim 6, wherein the data store is a first data store, and wherein the employing of the Q-learning-based reinforcement learning process comprises:
generating, via a second data store, the Q-table, wherein the Q-table stores respective Q-values for state-action pairs comprising the respective states and respective actions of the respective groups of actions, wherein the respective states comprise the number of decentralized proxy nodes that are actively operating in the network, the distribution of virtualized proxies among the decentralized proxy nodes, and the network latency corresponding to the respective P2P communication links, and wherein the respective actions comprise the first modification of the selection of decentralized proxy nodes, the second modification of the distribution of the selection of decentralized proxy nodes, and the third modification of the load balancing of the network traffic;
successively receiving, from the group of decentralized proxy nodes, successive information representing respective successive states of the network corresponding to the respective P2P communication links;
based on the respective successive states of the network, incrementally modifying the Q-values for the state-action pairs; and
based on the Q-values, performing the optimization.

11. The system of claim 10, wherein the performing of the optimization comprises:
in response to the receiving of the information representing the present network state of the network, determining whether the information represents that a failure has occurred in a proxy node of the decentralized proxy nodes, wherein the information represents health metrics for the proxy node comprising response time, error rate, uptime, and utilization of a resource of the proxy node, and wherein the resource comprises a central processing unit or a memory; and
in response to determining that the information represents that the failure has occurred in the proxy node, performing at least one corrective action to facilitate a correction of the failure, wherein the at least one correction action comprises restarting the proxy node, redistributing a portion of the network traffic corresponding to the proxy node to another proxy node of the decentralized proxy nodes, isolating the proxy node from performing operations that are associated with the portion of the network traffic corresponding to the proxy node, or modifying a communication parameter corresponding to the operations.

12. The system of claim 10, wherein the Q-learning-based reinforcement learning process utilizes a first e-greedy-based decision making strategy of the respective e-greedy-based decision making strategies to select, via the Q-table during a first network state of a group of network states of the network, a first group of actions of the available actions to be performed via the optimization, wherein the Q-learning-based reinforcement learning process utilizes a second e-greedy-based decision making strategy of the respective e-greedy-based decision making strategies to select, via the Q-table during a second network state of the group of network states, a second group of actions of the available actions to be performed via the optimization, wherein the first e-greedy-based decision making strategy utilizes a first epsilon-value of the respective epsilon-values that is less than a second epsilon-value of the respective epsilon-values that is utilized by the second e-greedy-based decision making strategy, wherein the first group of actions comprise first actions that have been typically selected by the Q-learning-based reinforcement learning process during the group of network states, wherein the second group of actions comprise second actions that are different from the first group of actions, wherein the first and second epsilon-values are the respective defined hyperparameters of the system.

13. The system of claim 1, wherein the group of decentralized proxy nodes comprises at least one of a containerized node or a virtual machine-based proxy node, and wherein the virtual machine-based proxy node corresponds to an open virtual appliance.

14. The system of claim 1, wherein the operations further comprise:

receiving, from a user identity, a request to perform an action, wherein the action comprises displaying at least a portion of the information representing the present network state of the network, adding or removing a proxy node of the group of decentralized proxy nodes, adding or removing a virtualized proxy of the proxy node, or modifying a configuration of at least one of the proxy node or the virtualized proxy node based on a parameter of the configuration that has been received, from the user identity, via another request; and based on the request, performing the action.

15. A method, comprising:

obtaining, by a system comprising at least one processor, a status of a network comprising a group of proxy nodes that communicate with respective proxy nodes of the group of proxy nodes in a peer-to-peer manner, wherein the status represents a current state of the network with respect to respective point-to-point (P2P) communication links between the respective proxy nodes; and based on the status of the network, utilizing, by the system, a Q-learning-based reinforcement learning process to facilitate optimization of a future state of the network by modifying, by the system, at least one of a proxy selection comprising a selection of proxy nodes to be included in the group of proxy nodes, a distribution of at least one of the selection of proxy nodes or a group of virtual proxy nodes within a network topology of the network, or a load balancing of network traffic, corresponding to the respective P2P communication links, among the distribution of the at least one of the selection of proxy nodes or the group of virtual proxy nodes, wherein the Q-learning-based reinforcement learning process utilizes respective e-greedy-based decision making strategies to select, during respective states of the network via a Q-table based on respective epsilon-values that are respective defined hyperparameters of the system, respective groups of actions to be performed via the optimization.

16. The method of claim 15, wherein the utilizing of the Q-learning-based reinforcement learning process comprises:

utilizing a data store to facilitate the optimization of the future state of the network, wherein the data store comprises performance metrics representing a state of the respective states of the network representing network conditions of the network and usage patterns of the network, an action domain representing available actions of the respective groups of actions to affect an optimization of the future state of the network, and reward metrics promoting respective actions of the available actions.

17. The method of claim 16, wherein the performance metrics comprise a number of proxy nodes that are actively operating in the network, a distribution of virtualized proxies among the proxy nodes, and network latency corresponding to the respective P2P communication links, wherein the action domain comprises a first modification of the proxy selection, a second modification of the distribution of the selection of proxy nodes or the group of virtual proxy nodes, and a third modification of the load balancing of the network traffic, and wherein the reward metrics comprise respective network response times, proxy node resource allocation, and a stability of the system with respect to the network traffic.

18. The method of claim 15, wherein the utilizing of the Q-learning-based reinforcement learning process comprises:

determining whether the status represents that a failure has occurred in a proxy node of the group of proxy nodes, wherein the status represents health metrics for the proxy node comprising response time, error rate, uptime, and utilization of a resource of the proxy node, and wherein the resource comprises a central processing unit or a memory; and in response to determining that the status represents that the failure has occurred in the proxy node, performing at least one corrective action to facilitate a correction of the failure, wherein the at least one correction action comprises restarting the proxy node, redistributing a portion of the network traffic corresponding to the proxy node to another proxy node of the group of proxy nodes, isolating the proxy node from performing operations that are associated with the portion of the network traffic corresponding to the proxy node, or modifying a communication parameter corresponding to the operations.

19. A non-transitory machine-readable medium comprising instructions that, in response to execution, cause a system comprising at least one processor to perform operations, the operations comprising:

receiving information representing a present network state of a network corresponding to respective point-to-point (P2P) communication links between respective proxy nodes of a group of proxy nodes of the network, wherein the proxy nodes are communicatively coupled to the respective proxy nodes in a peer-to-peer manner; and based on the present network state, employing a Q-learning-based reinforcement learning process to facilitate optimization of a future network state of the network, wherein the optimization comprises modifying at least one of a selection of proxy nodes to be included in the group of proxy nodes, a distribution of the selection of proxy nodes within a network topology of the network, or a load balancing of network traffic among the selection of proxy nodes, and wherein the Q-learning-based reinforcement learning process utilizes respective e-greedy-based decision making strategies to select, during respective states of the network via a Q-table based on respective epsilon-values that are respective defined hyperparameters of the system, respective groups of actions to be performed via the optimization.

20. The non-transitory machine-readable medium of claim 19, wherein the employing of the Q-learning-based reinforcement learning process comprises:

utilizing a data store to facilitate the optimization of the future network state of the network, wherein the data store comprises performance metrics representing a state of the respective states of the network representing network conditions of the network and usage patterns of the network, an action domain representing available actions of the respective groups of actions to affect the optimization of the future network state of the network, and reward metrics promoting respective actions of the available actions.

\* \* \* \* \*